(12) United States Patent  
Sabelkin

(10) Patent No.: US 11,068,562 B2  
(45) Date of Patent: Jul. 20, 2021

(54) EFFICIENT METHOD AND APPARATUS FOR FAST SIGNAL PROCESSING

(71) Applicant: Mykhaylo Sabelkin, Fairborn, OH (US)

(72) Inventor: Mykhaylo Sabelkin, Fairborn, OH (US)

( * ) Notice: Subject to any disclaimer, the term of this patent is extended or adjusted under 35 U.S.C. 154(b) by 109 days.

(21) Appl. No.: 16/676,377

(22) Filed: Nov. 6, 2019

(65) Prior Publication Data

US 2020/0073910 A1    Mar. 5, 2020

Related U.S. Application Data

(63) Continuation-in-part of application No. 14/809,707, filed on Jul. 27, 2015, now abandoned, and a
(Continued)

(51) Int. Cl.
| | |
|---|---|
| *G06F 17/14* | (2006.01) |
| *H04L 29/08* | (2006.01) |
| *H04L 25/02* | (2006.01) |
| *H04L 1/20* | (2006.01) |
| *H04N 19/184* | (2014.01) |
| *H04N 19/60* | (2014.01) |
| *H04N 19/91* | (2014.01) |
| *H04N 19/42* | (2014.01) |
| *H04N 19/90* | (2014.01) |

(52) U.S. Cl.
CPC ............ *G06F 17/14* (2013.01); *H04L 1/20* (2013.01); *H04L 25/0228* (2013.01); *H04L 67/10* (2013.01); *H04N 19/184* (2014.11); *H04N 19/42* (2014.11); *H04N 19/60* (2014.11); *H04N 19/90* (2014.11); *H04N 19/91* (2014.11)

(58) Field of Classification Search
CPC ....... G06F 17/14; G06F 17/142; H04L 67/10; H04L 25/0228; H04L 1/20; H04L 25/0204; H04L 25/0224; H04N 19/184; H04N 19/60; H04N 19/91; H04N 19/42; H04N 19/90; H04N 19/635
USPC ................................................ 708/400–409
See application file for complete search history.

(56) References Cited

U.S. PATENT DOCUMENTS

| 4,748,579 A | * | 5/1988 | Zibman | ................. G06F 17/142 708/400 |
| 5,805,484 A | * | 9/1998 | Ikeda | .................... G06F 17/142 708/403 |

* cited by examiner

*Primary Examiner* — Tan V Mai

(57) ABSTRACT

A method and apparatus for fast signal processing is presented. Increase of traffic over data communication networks requires increase of data processing speed. The proposed method is faster than the conventional technique, because it uses less operations of multiplications and additions. The method implements a flexible algorithm architecture based on an elementary cell which is used for both direct and inverse transforms. The method can be implemented for fast analysis and synthesis of different signal types; for fast multiplexing and demultiplexing; and for channel estimation and modeling. The flexible architecture allows: 1) conducting signal analysis according to a certain criterion, and operating on the whole signal or it's part; 2) modifying multiplexed datastream number "on the fly", splitting and merging groups of datastreams from different sources; 3) splitting a communication channel into a set of subchannels of different bandwidth, organizing data communication in particular subchannels that satisfy certain requirement.

11 Claims, 5 Drawing Sheets

The elementary cells $W_2$ and $V_2$

Related U.S. Application Data continuation-in-part of application No. 15/466,727, filed on Mar. 22, 2017, now Pat. No. 9,986,252, which is a continuation-in-part of application No. 14/809,727, filed on Jul. 27, 2015, now abandoned, which is a continuation of application No. 13/090,608, filed on Apr. 20, 2011, now abandoned, said application No. 14/809,707 is a continuation-in-part of application No. 13/090,608, filed on Apr. 20, 2011, now abandoned.

(60) Provisional application No. 61/326,579, filed on Apr. 21, 2010.

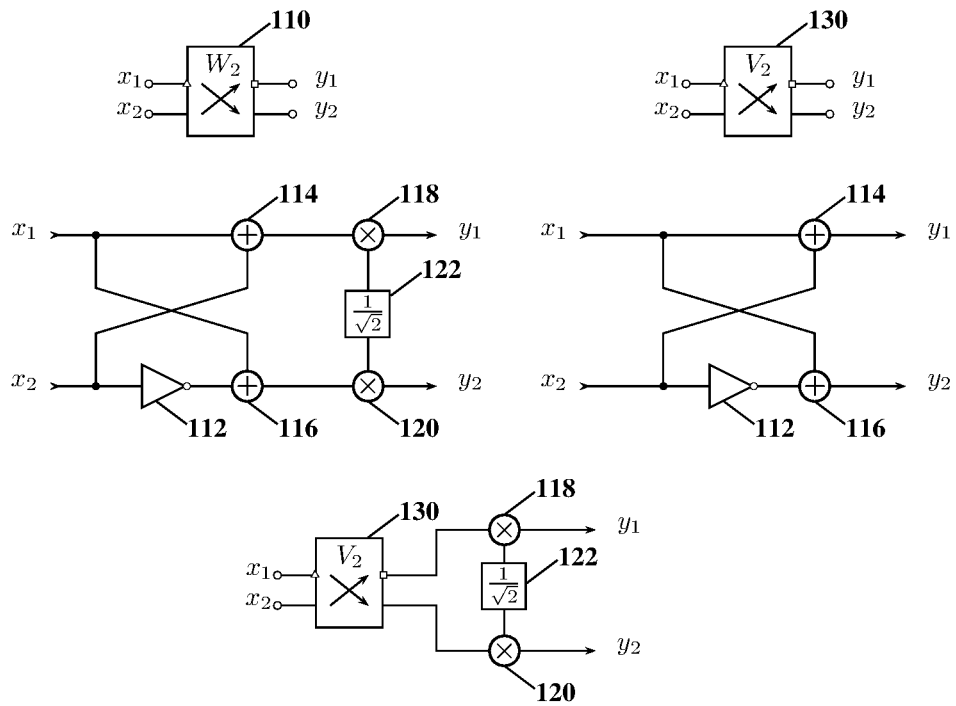
Fig. 1: The elementary cells $W_2$ and $V_2$
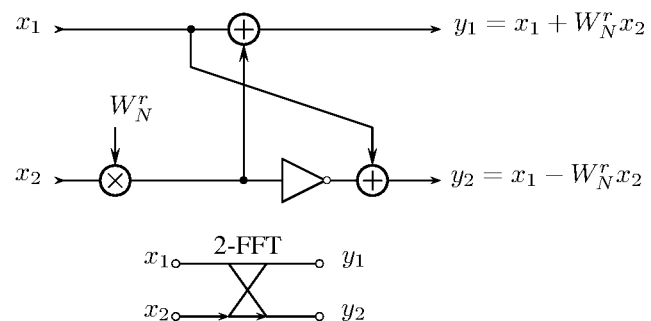
Fig. 2: The Fast Fourrier Transform (FFT) butterfly

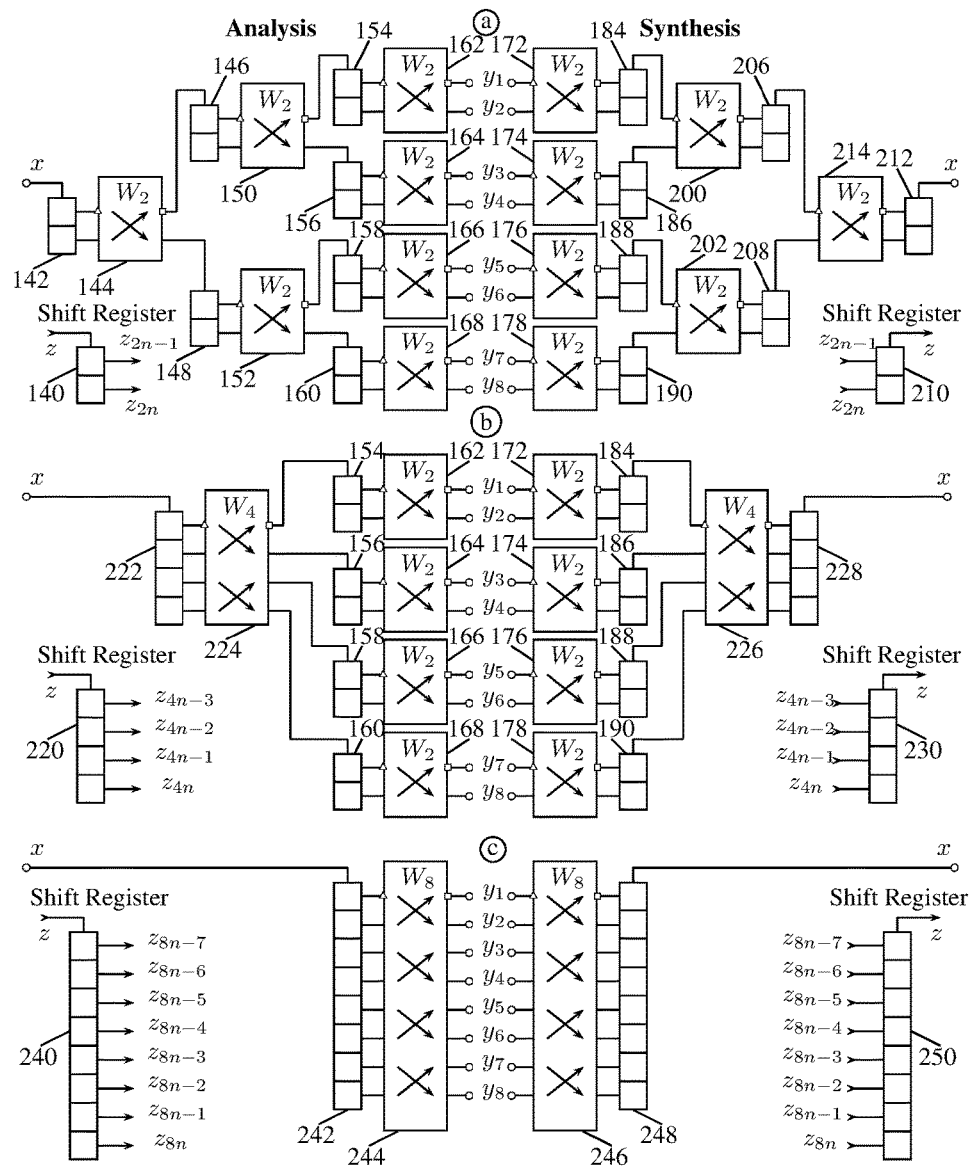
Fig. 3: The schemes of the third level analysis-synthesis of the one-dimensional data object

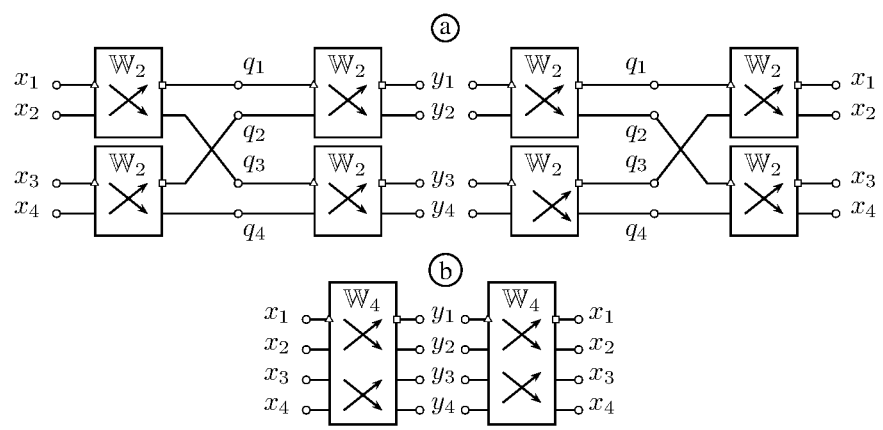
Fig. 4: The scheme of the $W_4$ cell as a combination of four elementary cells $W_2$

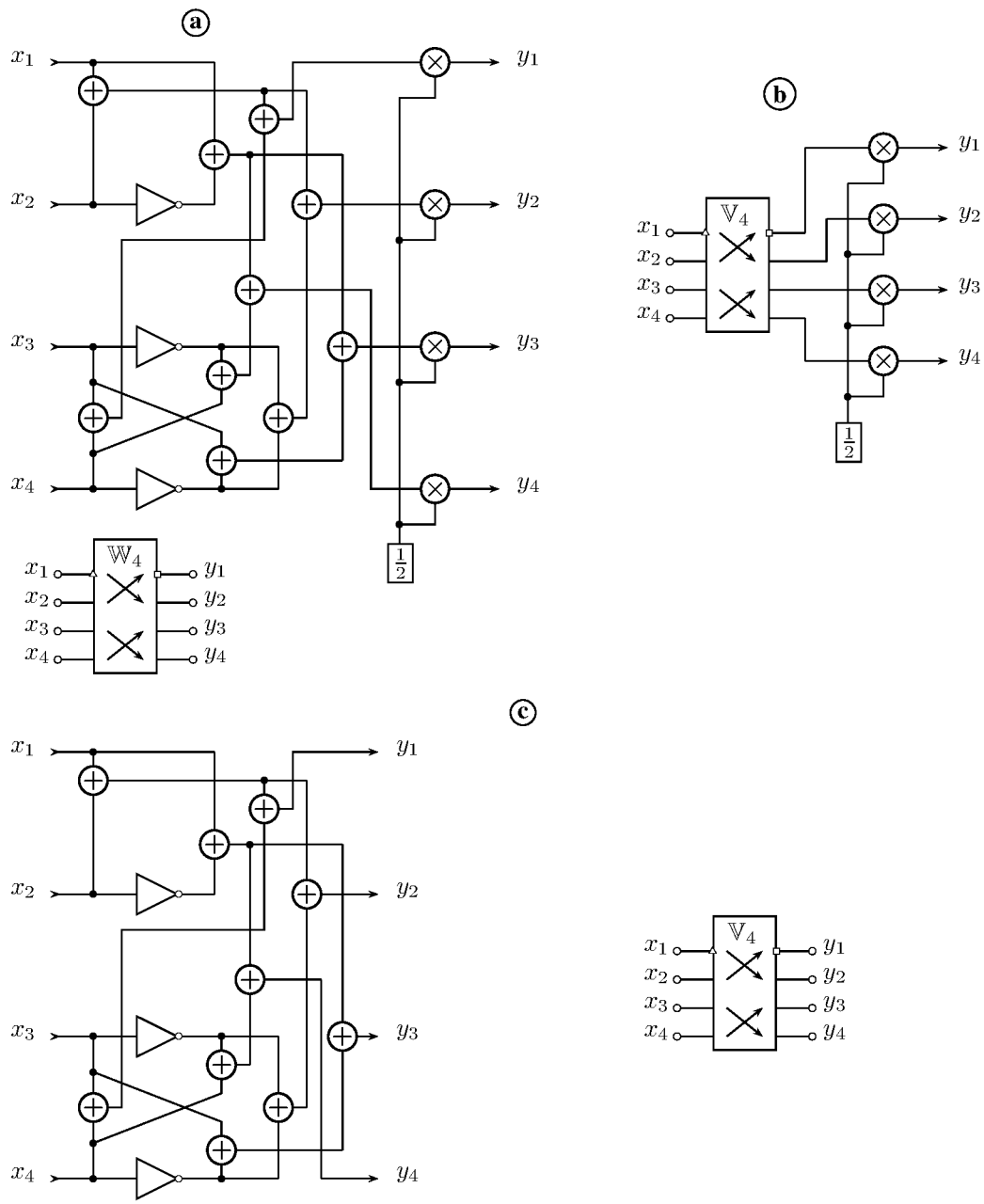
Fig. 5: The $W_4$ and $V_4$ cells' structure

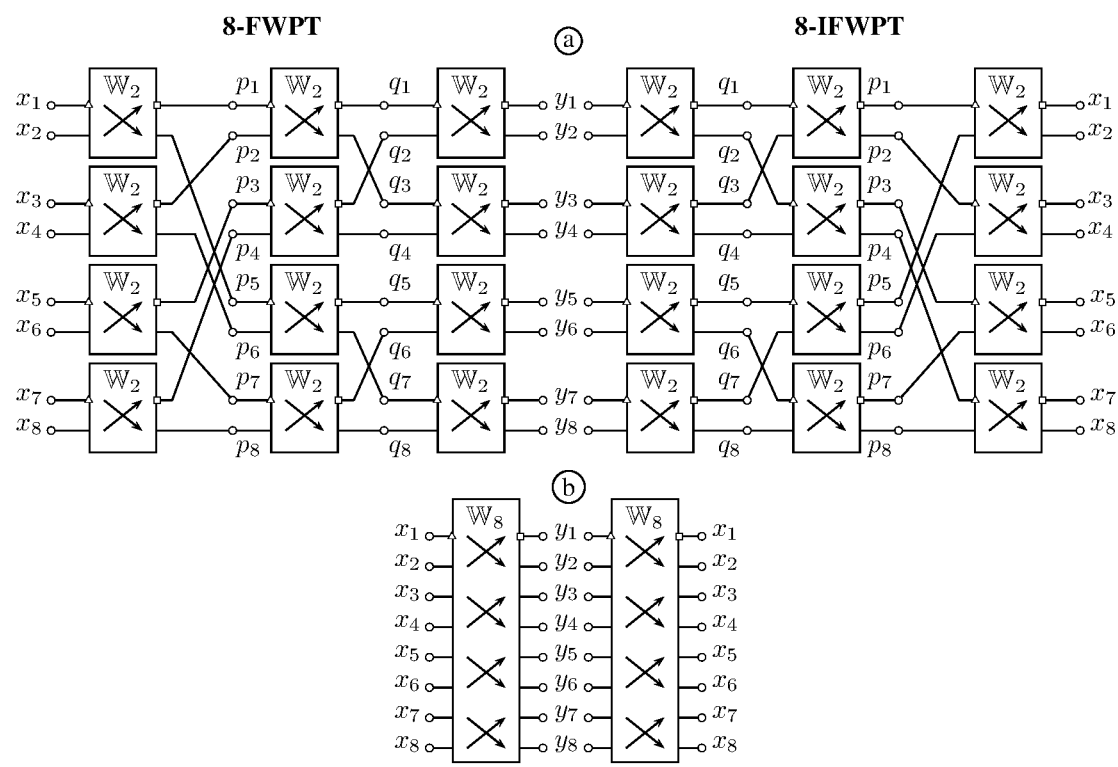
Fig. 6: The $W_8$ cell structure

EFFICIENT METHOD AND APPARATUS FOR FAST SIGNAL PROCESSING

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

Traffic over data communication networks is increasing constantly. This fact requires data communication systems to increase data processing speed. Conventional signal processing techniques often fail to satisfy new requirements.

The present invention is in the technical field of signal processing. More particularly, the present invention is in the technical field of signal analysis/synthesis, channel estimation/modeling, and data multiplexing/demultiplexing.

The proposed signal processing method uses less operations of multiplications and additions, than the conventional signal processing technique does. Hence it is faster than the conventional technique such as a Fast Fourier Transform (FFT).

The proposed method uses the same algorithm for direct and inverse transforms. Hence it requires less system resources compare to the conventional technique such as a pair of transforms: Fast Fourier Transform (FFT) and Inverse Fast Fourier Transform (IFFT).

The proposed method uses a flexible algorithm architecture based on an elementary cell. This fact allows to adapt the algorithm structure to capabilities of platform it is deployed on. Also the flexible algorithm architecture allows to modify the algorithm structure "on the fly" without interrupting the processing.

BRIEF SUMMARY OF THE INVENTION

The present invention is a method and apparatus for fast signal analysis/synthesis, channel estimation/modeling, and data multiplexing/demultiplexing.

The proposed method can be implemented for fast analysis and synthesis of a one-dimensional (1D) signal, such as an audio signal, a voice, a control sequence; a two-dimensional (2D) signal, such as a grayscale image; a three dimensional signal (3D), such as a static 3D mesh or a color image; a four dimensional signal, such as a dynamic 3D mesh or a color video signal; and a five dimensional signal such as a stereo color video signal. The flexible algorithm architecture allows to conduct a signal analysis according to a certain criterion. Also the flexible algorithm architecture allows to operate on the whole signal or it's part.

The proposed method can be implemented for fast multiplexing and demultiplexing of multiple datastreams. The flexible algorithm architecture allows to modify datastream number "on the fly" without interrupting the processing. Also the flexible algorithm architecture allows split and merge groups of datastreams from different sources. For example, the proposed method can be used to implement a multiple user access to a single communication channel.

The proposed method can be implemented for communication channel estimation and modeling. The flexible algorithm architecture allows to split a communication channel into a set of subchannels of different bandwidth. Also the flexible algorithm architecture allows organizing data communication in particular subchannels that satisfy the requirement on Quality of Service (QoS).

The proposed method is used in a system implementing a method of Data Transmission Oriented on the Object, Communication Media, Agents, and State of Communication Systems described in [1]. In that system, the proposed method is implemented for data analysis/synthesis, channel estimation/modeling, and datastream multiplexing/demultiplexing.

BRIEF DESCRIPTION OF THE DRAWINGS

FIG. 1 are the elementary cells $W_2$ and $V_2$;

FIG. 2 is the Fast Fourrier Transform (FFT) butterfly;

FIG. 3 is the scheme of the third level of the analysis-synthesis of the digital signal $x[n]$;

FIG. 4 is the scheme of the $W_4$ cell as a combination of four elementary cells $W_2$;

FIG. 5 is the $W_4$ cell structure;

FIG. 6 is the $W_8$ cell structure;

DETAILED DESCRIPTION OF THE INVENTION

Referring now to the invention in more detail. The core of the fast signal processing method is an elementary cell $W_2$ 110 and an elementary cell $V_2$ 130. They are shown on FIG. 1.

The Elementary Cell $W_2$

The elementary cell $W_2$ 110 consists of an inverter 112, an adder 114, an adder 116, a multiplier 118, a multiplier 120, and a block 122 generating a constant $$\frac{1}{\sqrt{2}}.$$

The elementary cell $V_2$ 130 consists of the inverter 112, the adder 114, and the adder 116.

In other view, the elementary cell $W_2$ 110 consists of the elementary cell $V_2$ 130, a multiplier 118, a multiplier 118, and a block 122 generating a constant $$\frac{1}{\sqrt{2}}.$$

The elementary cell $W_2$ posesses a unique property described below. In a matrix form, the outputs of the elementary cell are the following:

$$\begin{pmatrix} A[n] \\ D[n] \end{pmatrix} = \frac{1}{\sqrt{2}} \begin{pmatrix} 1 & 1 \\ 1 & -1 \end{pmatrix} \begin{pmatrix} x[2n-1] \\ x[2n] \end{pmatrix}, \qquad (1)$$

$$\overline{C}[n] = W_2 \overline{X}[n] = \frac{1}{\sqrt{2}} V_2 \overline{X}[n],$$

where the vector $\overline{C}[n]$ represents a pair of approximation and detail coefficients $$\overline{C}[n] = \begin{pmatrix} A[n] \\ D[n] \end{pmatrix};$$

the vector $\overline{X}[n]$ represents a pair of odd and even signal samples $$\overline{X}[n] = \begin{pmatrix} x[2n-1] \\ x[2n] \end{pmatrix};$$

the matrix $$\mathbb{V}_2 = \begin{pmatrix} 1 & 1 \\ 1 & -1 \end{pmatrix},$$

subscript number 2 reflects the order of the matrix $\mathbb{V}$; the matrix $$\mathbb{W}_2 = \frac{1}{\sqrt{2}} \mathbb{V}_2.$$

The algorithm of the fast elementary synthesis cell can be obtained by solving the matrix Equation 1 w.r.t. $\overline{X}[n]$:

$$\overline{C}[n] = \mathbb{W}_2 \overline{X}[n],$$

$$\mathbb{W}_2^{-1} \overline{C}[n] = \mathbb{W}_2^{-1} \mathbb{W}_2 \overline{X}[n],$$

$$\overline{X}[n] = \mathbb{W}_2^{-1} \overline{C}[n], \qquad (2)$$

The fast elementary synthesis cell requires to find the inverse matrix $\mathbb{W}_2^{-1}$. Suppose $$\mathbb{W}_2 = \begin{pmatrix} m_{00} = \frac{1}{\sqrt{2}} & m_{01} = \frac{1}{\sqrt{2}} \\ m_{10} = \frac{1}{\sqrt{2}} & m_{11} = -\frac{1}{\sqrt{2}} \end{pmatrix}, \qquad (3)$$

Then $$\mathbb{W}_2^{-1} = \frac{1}{m_{00}m_{11} - m_{01}m_{10}} \begin{pmatrix} m_{11} & -m_{01} \\ -m_{10} & m_{00} \end{pmatrix} = \qquad (4)$$

$$= \frac{1}{\frac{1}{\sqrt{2}} \cdot \left(-\frac{1}{\sqrt{2}}\right) - \frac{1}{\sqrt{2}} \cdot \frac{1}{\sqrt{2}}} \begin{pmatrix} -\frac{1}{\sqrt{2}} & -\frac{1}{\sqrt{2}} \\ -\frac{1}{\sqrt{2}} & \frac{1}{\sqrt{2}} \end{pmatrix} =$$

$$= \frac{-1}{-\frac{1}{2} - \frac{1}{2}} \begin{pmatrix} \frac{1}{\sqrt{2}} & \frac{1}{\sqrt{2}} \\ \frac{1}{\sqrt{2}} & -\frac{1}{\sqrt{2}} \end{pmatrix} =$$

$$= \frac{-1}{-\frac{2}{2}} \begin{pmatrix} \frac{1}{\sqrt{2}} & \frac{1}{\sqrt{2}} \\ \frac{1}{\sqrt{2}} & -\frac{1}{\sqrt{2}} \end{pmatrix} = \begin{pmatrix} \frac{1}{\sqrt{2}} & \frac{1}{\sqrt{2}} \\ \frac{1}{\sqrt{2}} & -\frac{1}{\sqrt{2}} \end{pmatrix} = \mathbb{W}_2.$$

Hence the inverse matrix $\mathbb{W}_2^{-1}$ is equal to the direct one $\mathbb{W}_2$. The unique property of elementary cell $\mathbb{W}_2$ is that the same cell can be used for direct and inverse transformation. This implies that the same elementary cell can be used in signal decomposition (analysis) as well as in signal reconstruction (synthesis).

In case the elementary cell $W_2$ 110 is used for analysis of a digital signal x[n], odd samples of the signal x[2n−1] inputs to a pin $x_1$ and even samples of the signal x[2n] inputs to a pin $x_2$.

In case the elementary cell $W_2$ 110 is used for analysis of the digital signal x[n], the pin $y_1$ outputs the approximation signal $$A[k] = \frac{1}{\sqrt{2}}(x[2n-1] + x[2n]),$$

and the pin $y_2$ outputs the detail signal $$D[k] = \frac{1}{\sqrt{2}}(x[2n-1] - x[2n]).$$

In case the elementary cell $W_2$ 110 is used for synthesis of the digital signal x[n], the approximation signal A[k] inputs to the pin $x_1$ and the detail signal D[k] inputs to the pin $x_2$.

In case the elementary cell $W_2$ 110 is used for synthesis of the digital signal x[n], the pin $y_1$ outputs the odd samples of the signal $$x[2n-1] = \frac{1}{\sqrt{2}}(A[k] + D[k]),$$

and the pin $y_2$ outputs the even samples of the signal $$x[2n] = \frac{1}{\sqrt{2}}(A[k] - D[k]).$$

The assignments for Input/Output pins are presented in Table 1.

Nowadays, the most common algorithm in Digital Signal Processing (DSP) is the Fast Fourrier Transform (FFT). FIG. 2 shows is the two-point Fast Fourrier Transform (FFT), or 2-FFT decimation-in-time butterfly.

TABLE 1

Input/Output pin assignment of the fast elementary cell

| Input | Analysis | Synthesis | Output | Analysis | Synthesis |
|---|---|---|---|---|---|
| $x_1$ | x[2n − 1] | A[k] | $y_1$ | A[k] | x[2n − 1] |
| $x_2$ | x[2n] | D[k] | $y_2$ | D[k] | x[2n] |

The first advantage of the elementary cell $W_2$ 110 over 2-FFT is that the elementary cell $W_2$ 110 can be used for both data analysis and data synthesis.

The second advantage of the elementary cell $W_2$ 110 is that it's complexity is less than the one of the 2-FFT. The results are presented in Table 2. The complexity of an algorithm is measured by quantity of real adders (⊕), real multipliers (⊗) and real inverters (⊖). Use of the elementary cell $W_2$ 110 and the elementary cell $V_2$ 130 does not change the nature of input numbers, i.e. the real input numbers stay real. However, output of 2-FFT butterfly is always represented by complex numbers. Since, the 2-FFT butterfly is applied more than ones, the input of the next stage 2-FFT operation will be complex, and there is no reason to consider the real input numbers for 2-FFT. Therefore the slot, corresponding to the number of operations on real input numbers, is empty in Table 2.

TABLE 2

Complexity of $W_2$, $V_2$ cells and 2-FFT butterfly in terms of real operations

| Input numbers | $W_2$ | $V_2$ | 2-FFT |
|---|---|---|---|
| Real | $2 \oplus + 2 \otimes + 1 \ominus$ | $2 \oplus + 1 \ominus$ | n/a |
| Complex | $4 \oplus + 4 \otimes + 2 \ominus$ | $4 \oplus + 2 \ominus$ | $6 \oplus + 4 \otimes + 3 \ominus$ |

The elementary cell $W_2$ 110 outputs the approximation and detail features of the input signal. One might decide to continue the procedure by analysing the features of features etc. The decision of whether to proceed with further analysis is based on certain criteria. Signal analysis is stopped upon a certain parameter of feature segment is reached. FIG. 3 shows the schemes of the third level analysis-synthesis of the one-dimensional data object x[n].

The $W_4$ and $W_8$ Cells

The elementary cell $W_2$ is used to build processing cells of higher orders, such as $W_4$ and $W_8$ cells. The scheme on FIG. 3 *a*) is purely based on the elementary cells $W_2$ 110. The third level analysis scheme consists of seven elementary cells $W_2$ (144, 150, 152, 162, 164, 166, 168), and seven shift registers (142, 146, 148, 154, 156, 158, 160). The shift register 140, used in the analysis scheme, outputs two datastreams. The first datastream consists of the odd samples $z_{2n-1}$ of the input datastream z. The second datastream consists of the even samples $z_{2n}$ of the input datastream z. The third level synthesis scheme consists of seven elementary cells $W_2$ (172, 174, 176, 178, 200, 202, 214), and seven shift registers (184, 186, 188, 190, 206, 208, 212). The shift register 210, used in the synthesis scheme, inputs two datastreams. The first datastream consists of the odd samples $z_{2n-1}$ of the output datastream z. The second datastream consists of the even samples $z_{2n}$ of the output datastream z.

In case a computational platform posesses enough resources, the computational speed of the analysis-synthesis can be increased by applying parallel computing techniques instead of serial ones. The scheme on FIG. 3 *b*) is based on the combination of the elementary cells $W_2$ 110 and $W_4$ cells. The third level analysis scheme consists of one $W_4$ cell 224, four elementary cells $W_2$ (162, 164, 166, 168), a four stage shift register 222, and four shift registers of type 140 (154, 156, 158, 160). The four stage shift register 220, used in the analysis scheme, outputs four datastreams. The four stage shift register 220 serves as a serial-to-parallel converter. The third level synthesis scheme consists of one $W_4$ cell 226, four elementary cells $W_2$ (172, 174, 176, 178), four shift registers of type 210 (184, 186, 188, 190), and a four stage shift register 230. The four stage shift register 230, used in the synthesis scheme, inputs four datastreams. The four stage shift register 230 serves as a parallel-to-serial converter.

In case a computational platform posesses even more resources, the computational speed of the analysis-synthesis can be increased even more. The scheme on FIG. 3 *c*) is based on $W_8$ cells. The third level analysis scheme consists of one $W_8$ cell 244, and an eight stage shift register 242. The eight stage shift register 240, used in the analysis scheme, outputs eight datastreams. The four stage shift register 240 serves as a serial-to-parallel converter. The third level synthesis scheme consists of one $W_8$ cell 246, and an eight stage shift register 248. The eight stage shift register 250, used in the synthesis scheme, inputs eight datastreams. The eight stage shift register 250 serves as a parallel-to-serial converter.

FIG. 4 shows the scheme of the $W_4$ cell as a combination of four elementary cells $W_2$.

Application of the $W_4$ cell for image analysis can be presented in a matrix form as follows:

$$\overline{C} = \mathbb{W}_4 \overline{X}. \tag{5}$$

The $W_4$ cell is defined by the matrix $\mathbb{W}_4$. Subscript four stands for the order of the matrix. Now we will derive the structure of the matrix $\mathbb{W}_4$ using FIG. 4:

$$y_1 = \frac{1}{\sqrt{2}}(q_1 + q_2) = \frac{1}{2}(x_1 + x_2 + x_3 + x_4); \tag{6}$$

$$y_2 = \frac{1}{\sqrt{2}}(q_1 - q_2) = \frac{1}{2}(x_1 + x_2 + x_3 + x_4);$$

$$y_3 = \frac{1}{\sqrt{2}}(q_3 + q_4) = \frac{1}{2}(x_1 + x_2 + x_3 + x_4);$$

$$y_4 = \frac{1}{\sqrt{2}}(q_3 - q_4) = \frac{1}{2}(x_1 + x_2 + x_3 + x_4).$$

Hence $$\mathbb{W}_4 = \frac{1}{2}\begin{pmatrix} 1 & 1 & 1 & 1 \\ 1 & 1 & -1 & -1 \\ 1 & -1 & 1 & -1 \\ 1 & -1 & -1 & 1 \end{pmatrix}. \tag{7}$$

Calculations proposed in Appendix I: Inverse Wavelet Packet Matrix $\mathbb{W}_4^{-1}$ of [2] show that the inverse matrix $\mathbb{W}_4^{-1}$ is equal to the direct one $\mathbb{W}_4$ ($\mathbb{W}_4 = \mathbb{W}_4^{-1}$). The unique property of the $W_4$ cell is that the same cell can be used for direct and inverse transformation. This implies that the same cell can be used in signal decomposition (analysis) as well as in signal reconstruction (synthesis).

The $W_4$ cell can be employed for analysis-synthesis of two-dimensional data object, or image. During analysis the $W_4$ cell transforms four image pixels (X[2n−1, 2m−1], X[2n−1, 2m], X[2n, 2m−1], X[2n, 2m]) into an approximation (A[n, m]) coefficient, and three detail coefficients: horizontal (H[n, m]), vertical (V [n, m]) and diagonal (D[n, m]). During synthesis the $W_4$ cell transforms the approximation (A[n, m]) coefficient, and three detail coefficients: horizontal (H[n, m]), vertical (V[n, m]) and diagonal (D[n, m]) into four image pixels (X[2n−1, 2m−1], X[2n−1, 2m], X[2n, 2m−1], X[2n, 2m]). Where n=1 . . . N, m=1 . . . M, N×M is the image size. The assignments for Input/Output pins are presented in Table 3 for both cases of use the two-dimensional elementary cell in image analysis and synthesis.

TABLE 3

Input/Output pin assignment of the 2D fast elementary cell

| Input | Analysis | Synthesis | Output | Analysis | Synthesis |
|---|---|---|---|---|---|
| $x_1$ | x[2n − 1, 2m − 1] | A[n, m] | $y_1$ | A[n, m] | X[2n − 1, 2m − 1] |
| $x_2$ | x[2n − 1, 2m] | H[n, m] | $y_2$ | H[n, m] | X[2n − 1, 2m] |

TABLE 3-continued

Input/Output pin assignment of the 2D fast elementary cell

| Input | Analysis | Synthesis | Output | Analysis | Synthesis |
|---|---|---|---|---|---|
| $x_3$ | x[2n, 2m − 1] | V[n, m] | $y_3$ | V[n, m] | X[2n, 2m − 1] |
| $x_4$ | x[2n, 2m] | D[n, m] | $y_4$ | D[n, m] | X[2n, 2m] |

FIG. 5 shows the structure of the $W_4$ and $V_4$ cells as a combination inverters, adders, multipliers, and blocks generating a constant $$\frac{1}{2}.$$

Complexities $W_4$ and $V_4$ cells are presented in 4

TABLE 4

Complexity of $W_4$, $V_4$ cells in terms of real operations

| Input numbers | $W_4$ | $V_4$ |
|---|---|---|
| Real | 10 ⊕ + 4 ⊗ + 3⊖ | 10 ⊕ + 3⊖ |
| Complex | 20 ⊕ + 8 ⊗ + 10⊖ | 20 ⊕ + 6⊖ |

An operation of multiplication by $$\frac{1}{2}$$

can be replaced by the shift operation. In that case no multiplication operations required in $W_4$.

FIG. 6 shows the structure of the $W_8$ cell as a combination of the $W_2$ cells.

The $W_N$ Cell ($N=2^n$, $n \in Z$)

Generally, the $W_N$ cell ($N=2^n$, $n \in Z$) can be build. It will be able to operate on N data points simultaneously. An implementation of the $W_N$ cell is limited by computational platform resources.

Following the same methodology of calculations proposed in Appendix I: Inverse Wavelet Packet Matrix $\mathbb{W}_4^{-1}$ of [2], one experienced in the field can prove that the inverse matrix $\mathbb{W}_N^{-1}$ is equal to the direct one $\mathbb{W}_N$ ($\mathbb{W}_N = \mathbb{W}_N^{-1}$) for an arbitrary value of N. Therefore the unique property of the $W_N$ cell is that the same cell can be used for direct and inverse transformation. This implies that the same cell can be used in signal decomposition (analysis) as well as in signal reconstruction (synthesis).

The complexity of $W_N$ cell ($N=2^n$, $n \in Z$) in comparison with the complexity of the N-point FFT is presented in Table 5.

The elementary cell $W_2$ 110 can be envisioned as the elementary cell $V_2$ 114 whose output is multiplied by $$\frac{1}{\sqrt{2}}.$$

By analogy, the $W_N$ can be envisioned as the $V_N$ whose output is multiplied by $$\left(\frac{1}{\sqrt{2}}\right)^d = 2^{-\frac{d}{2}},$$

where $d=\log_2 N$. In case $d=2k$ is even, the multiplier $$2^{-\frac{d}{2}} = 2^{-k}$$

can be replaced by the shift register. In case $d=2k+1$ is odd, the multiplier can be envisioned as the two multipliers $$2^{-\frac{2k+1}{2}} = 2^{-k} \cdot \frac{1}{\sqrt{2}}.$$

Multiplication by $2^{-k}$ can be replaced by the shift register, however multiplication by $$\frac{1}{\sqrt{2}}$$

should be implemented. Totally N multipliers by $$\frac{1}{\sqrt{2}}$$

are required for the $W_N$ in case $d=\log_2 N$ is odd.

TABLE 5

Complexity of the N-point FWPT vs. the N-point FFT in terms of real operations

| Input numbers | $W_N$ | FFT |
|---|---|---|
| Real | $\frac{N}{2}\log_2 N(2 \oplus + 1 \ominus) + \beta N \otimes$ | n/a |
| Complex | $\frac{N}{2}\log_2 N(4 \oplus + 2 \ominus) + 2\beta N \otimes$ | $\frac{N}{2}\log_2 N(6 \oplus + 4 \otimes + 3 \ominus)$ | where $\beta = \begin{cases} 0 \text{ if } d = \log_2 N \text{ is even} \\ 1 \text{ if } d = \log_2 N \text{ is odd} \end{cases}$ Same $W_N$ cell can be implemented for both multiplexing and demultiplexing of $N=2^n$ ($n \in Z$) datastreams. For multiplexing of N datastreams they should be applied to the inputs of the $W_N$ cell. Outputs of the $W_N$ cell are connected to the shift register of order N. Shift register 250 represents an example of the shift register of the order 8. The shift register of order N outputs a serial datastream. For demultiplexing, the serial datastream is applied to the input of the shift register of order N. Shift register 240 represents an example of the shift register of the order 8. The parallel outputs of the shift register of order N are connected to the inputs of $W_N$ cell. The N outputs of the $W_N$ cell represent N demultiplexed datastreams.

The $W_N$ cell based multiplexing-demultiplexing can be implemented for communication channel estimation and modeling. N pilot signals multiplexed and sent over a communication channel allow to estimate a channel profile. According to that profile, the channel can be divided into subchannels of different bandwidth. Efficient data communication can be organized in particular subchannels that satisfy the requirement on Quality of Service (QoS).

The invention can be implemented in a form of software, firmware running on computing devices or a hardware.

While the invention has been shown and described with reference to certain preferred embodiments thereof, it will be understood by those skilled in the art that various changes in form and details may be made therein without departing from the spirit and scope of the invention as defined by the appended claims.

REFERENCES

[1] M. Sabelkin, "Method and apparatus for efficient data communications," U.S. Pat. No. 9,986,252 B2, issued on May 29, 2018.
[2] M. Sabelkin, "Data transmission oriented on the object, communication media, application, and state of communication systems: Tactical communication system application," Ph.D. dissertation, Ecole de technologie superieure, Montreal, Canada, 11 2011.

What is claimed:

1. A method for fast signal processing, comprising steps performed by a plurality of blocks connected in banks and in series wherein each said block
    outputs the first sample which is a weighted sum of two input samples, and
    outputs the second sample which is a weighted difference of said two input samples,
wherein a value of a weight is chosen to provide said method with a property of equality of direct transformation and inverse transformation.

2. A method for fast signal analysis-synthesis implementing the method according to claim 1, which transforms a signal into a set of signal features in case of said signal analysis; and which transforms said set of signal features into said signal in case of said signal synthesis.

3. A data analyzer-synthesizer implementing the method according to claim 2.

4. A method for quality driven data object decomposition, comprising:
    steps, performed by the method according to claim 2, of data object decomposition into a set of data object features until certain criteria is reached;
    and steps, performed by a quality assignment block, of assignment an error sensitivity descriptor to each one of said data object features;
whereby said data object is transformed into said set of data object features with different error sensitivity.

5. The method according to claim 2 for data multiplexing-demultiplexing.

6. A datastream multiplexer-demultiplexer implementing the method according to claim 5.

7. A method for channel profile estimation, comprising:
    generating identical pilot signals in a transmitter and receiver;
    multiplexing said pilot signals using said fast signal synthesis to transform a set of said pilot signals into a single multiplexed signal in said transmitter according to claim 5;
    sending said multiplexed signal to said receiver through a communication channel whose profile needs to be estimated;
    demultiplexing of a received signal using said fast signal analysis to decompose said received signal into a set of received pilot signals in said receiver according to claim 5;
whereby said channel profile is obtained in said receiver by comparison of said generated pilot signals with said received pilot signals.

8. A communication channel estimator implementing the method according to claim 7.

9. A method for efficient channel multiplexing-demultiplexing, comprising:
    obtaining a channel profile in said receiver using said channel profile estimation according to claim 7;
    communicating said channel profile to said transmitter;
    identifying subchannels usable and unusable for particular reasons in said receiver;
    defining a particular structure of said fast signal analysis and synthesis transform which matches a pattern of said usable subchannels;
    applying said fast signal synthesis transform of said structure for datastreams mapping into said usable subchannels in said transmitter;
    applying said fast signal analysis transform of said structure for demapping of datastreams in said receiver.

10. A communication channel multiplexer-demultiplexer implementing the method according to claim 9.

11. A method for fast signal processing, comprising steps performed by a plurality of blocks connected in banks and in series wherein each said block implements the following steps:
    adding the first input sample and the second input sample performed by an adder;
    subtracting of said second input sample from said first input sample performed by a subtractor;
    producing a constant value performed by a constant block;
    multiplying said added samples by said constant value producing the first output sample performed by the first multiplier;
    multiplying said subtracted samples by said constant value producing the second output sample performed by the second multiplier;
wherein said constant value is chosen to provide said method with a property of equality of direct transformation and inverse transformation.

* * * * *